(12) United States Patent
Nakata et al.

(10) Patent No.: US 7,684,217 B2
(45) Date of Patent: Mar. 23, 2010

(54) POLYPHASE INVERTER, CONTROL METHOD THEREOF, AIR SENDING DEVICE AND POLYPHASE CURRENT OUTPUT SYSTEM

(75) Inventors: Tetsuo Nakata, Shiga (JP); Yasuto Yanagida, Shiga (JP)

(73) Assignee: Daikin industries, Ltd., Osaka (JP)

( * ) Notice: Subject to any disclaimer, the term of this patent is extended or adjusted under 35 U.S.C. 154(b) by 96 days.

(21) Appl. No.: 11/988,552

(22) PCT Filed: May 16, 2006

(86) PCT No.: PCT/JP2006/309761

§ 371 (c)(1),
(2), (4) Date: May 2, 2008

(87) PCT Pub. No.: WO2007/007466

PCT Pub. Date: Jan. 18, 2007

(65) Prior Publication Data
US 2009/0027935 A1 Jan. 29, 2009

(30) Foreign Application Priority Data

Jul. 12, 2005 (JP) ............................. 2005-203295

(51) Int. Cl.
*H02M 5/45* (2006.01)
*H02M 5/458* (2006.01)
(52) U.S. Cl. .................. 363/34; 363/37; 363/98; 363/132
(58) Field of Classification Search .................. 363/34, 363/37, 36, 95, 98, 131, 132
See application file for complete search history.

(56) References Cited

U.S. PATENT DOCUMENTS

| 5,200,887 | A | * | 4/1993 | Ioroi et al. ................... 363/143 |
| 5,703,459 | A | | 12/1997 | Yasohara et al. |
| 5,747,833 | A | | 5/1998 | Fujisaki et al. |
| 6,437,996 | B1 | * | 8/2002 | Wobben ....................... 363/37 |
| 2003/0053324 | A1 | * | 3/2003 | Yamamoto et al. ........... 363/127 |
| 2003/0076696 | A1 | * | 4/2003 | Tsai ............................. 363/37 |

(Continued)

FOREIGN PATENT DOCUMENTS

EP 1 056 205 A2 11/2000

(Continued)

OTHER PUBLICATIONS

Mitsubishi Electric Corporation, "Mitsubishi HVIC Application Note" [online], Jun. 30, 2005, Internet <URL: http://www.mitsubishichips.com/Japan/files/manuals/km0020a1.pdf>.

*Primary Examiner*—Bao Q Vu
(74) *Attorney, Agent, or Firm*—Birch, Stewart, Kolasch & Birch, LLP (57) ABSTRACT

Capacitors act as bootstrap capacitors of a high side control circuits. The capacitors are charged in a period in which all of high arm switching devices are non-conductive, so-called in a precharge period. When any of U-phase current, V-phase current and W-phase current is smaller than a negative predetermined value (when an absolute value is larger), it is judged which is the largest value. The low arm switching device is turned on only for a phase corresponding to the current of the largest value and the low arm switching devices of other phases are turned off.

8 Claims, 6 Drawing Sheets

U.S. PATENT DOCUMENTS

| | | | |
|---|---|---|---|
| 2004/0008530 A1* | 1/2004 | Kitahata et al. | 363/131 |
| 2004/0125622 A1* | 7/2004 | Hirono | 363/37 |
| 2004/0141347 A1* | 7/2004 | Naito et al. | 363/132 |
| 2005/0111246 A1* | 5/2005 | Lai et al. | 363/157 |

FOREIGN PATENT DOCUMENTS

| | | |
|---|---|---|
| JP | 9-9661 A | 1/1997 |
| JP | 9-28031 A | 1/1997 |
| JP | 9-65689 A | 3/1997 |
| JP | 2001-275366 A | 10/2001 |
| JP | 2003-348880 A | 12/2003 |
| JP | 2004-304527 A | 10/2004 |

* cited by examiner

POLYPHASE INVERTER, CONTROL METHOD THEREOF, AIR SENDING DEVICE AND POLYPHASE CURRENT OUTPUT SYSTEM

TECHNICAL FIELD

The present invention relates to a polyphase inverter adopting a bootstrap method.

BACKGROUND ART

There is a polyphase inverter having a control circuit (referred to as a "high side control circuit") for driving a high arm switching device and a control circuit (referred to as a "low side control circuit") for driving a low arm switching device separately. In addition, a so-called bootstrap method in which a power source for driving the high side control circuit is obtained from a capacitor, which is charged through the low arm switching device has been proposed. Refer to, for example, the following patent documents 1, 2 and non-patent document 1.

Patent Document 1: Japanese Patent Application Laid-Open Gazette No. 2003-348880

Patent Document 2: Japanese Patent Application Laid-Open Gazette No. 2004-304527

Non-Patent Document 1: Mitsubishi Electric Corporation, "Mitsubishi HVIC Application Note" [online], [searched on Jun. 30, 2005], Internet <URL: http://www.mitsubishichips.com/Japan/files/manuals/km0020a1.pdf>

In the bootstrap method, a period (referred to as a "precharge period") for charging the above-described capacitor for bootstrap (referred to as a "bootstrap capacitor") is set before performing a normal operation, and in this period, while the high arm switching devices are turned off, the low arm switching devices are sequentially turned on and a charge (referred to as a "precharge") of the bootstrap capacitor is performed.

Figure 6:
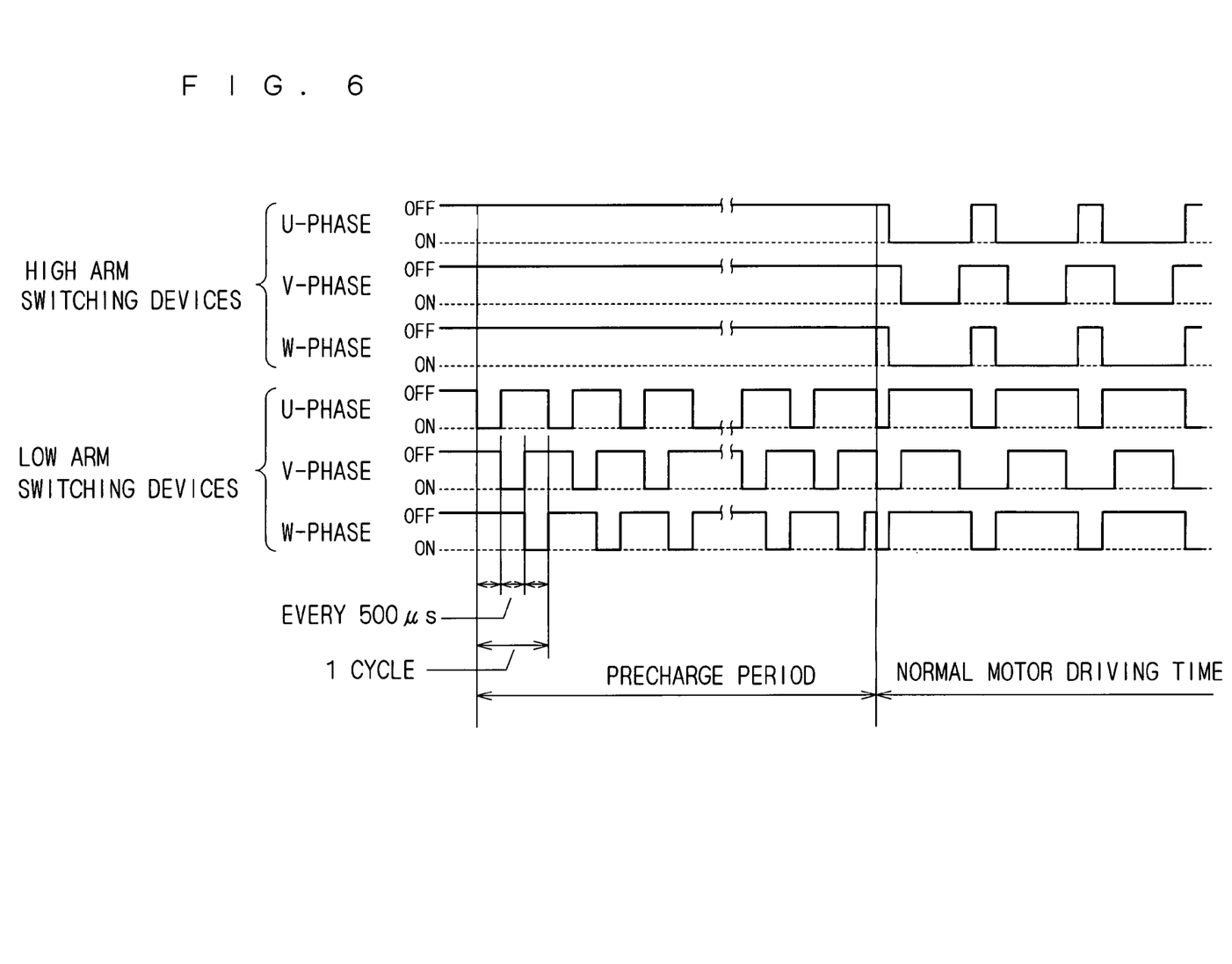
FIG. 6 is a timing chart showing a precharge period in a three-phase inverter and on/off of a switching device in a motor driving time following the same.

FIG. 6 is a timing chart showing the precharge period in a three-phase inverter and on/off of the switching devices in a motor driving time following the same. For example, the low arm switching devices in U-phase, V-phase and W-phase are turned on in this order for every 500 μs in the precharge period. When a cycle in which the low arm switching devices in the three-phase are turned on is set to one cycle, the precharge period is 30 cycles, for example, that is to say, over a length of 45 ms.

When the precharge period is finished, the high arm switching devices of U-phase, V-phase and W-phase and the low arm switching devices of U-phase, V-phase and W-phase are turned on/off by a pulse width modulation control, for example, for a normal motor driving.

DISCLOSURE OF THE INVENTION

Problem to be Solved by the Invention

However, there is a case in which a voltage is generated on a load (polyphase load) of the polyphase inverter by a cause other than the polyphase inverter. For example, in a case in which the polyphase load is the motor for driving a fan, when the fan is rotated by a wind, the voltage is generated on the motor as the polyphase load.

Since the polyphase load is not driven from the polyphase inverter in the precharge period, such rotation of the motor is not prevented. In addition, in the precharge period, depending on timing that the low arm switching devices of U-phase, V-phase and W-phase are turned on, there is a case in which regenerating operation condition is generated and a direct voltage rises on a side of the polyphase inverter.

In general, when such an overvoltage is generated, an overcurrent also flows through the low arm switching device. Therefore, the precharge and the normal driving of the polyphase load are not performed, in order to protect the polyphase inverter. Specifically, a current flowing through the polyphase inverter is detected and when this is excessive, a switching operation of the polyphase inverter is stopped.

An object of the present invention is to make generation of such overcurrent difficult and to make generation of the overcurrent on the low arm switching device difficult, even when the voltage is generated on the polyphase load by an external cause in the precharge period.

Means for Solving the Problem

A polyphase inverter (4) according to the present invention includes a switching circuit (45), a plurality of capacitors (33), a plurality of high side control circuits (41, 42, 43) and a low side control circuit (44).

The switching circuit has a plurality of serial connections of high arm switching devices (Qu, Qv, Qw) and low arm switching devices (Qx, Qy, Qz) provided for each phase and a plurality of diodes (Du, Dv, Dw, Dx, Dy, Dz) parallelly connected to each of the high arm switching devices and the low arm switching devices for applying a current in a direction opposite to a direction in which the high arm switching devices and the low arm switching devices apply the current. Ends of a plurality of the high arm switching devices opposite to the low arm switching devices are commonly connected, ends of a plurality of the low arm switching devices opposite to the high arm switching devices are commonly connected, and an output current is output from a connection point of the high arm switching device and the low arm switching device to a polyphase load for each phase.

The capacitors are provided for each phase, and one end of each is connected to the connection point for each phase and is charged by conduction of the low arm switching device.

The high side control circuits are provided for each phase, and controls opening and closing of the high arm switching devices by receiving an operation power from the corresponding capacitor.

The low side control circuits allow the low arm switching devices provided at a phase corresponding to the output current that gives the largest value compared between phases, to conduct (S103, S104, S105), when the output current of any phase is smaller than a predetermined value, a direction from the connection point toward the polyphase load is set to positive (S102), in a period in which all of the high arm switching devices are non-conductive.

An air sending device according to the present invention includes the polyphase inverter (4), a polyphase motor (6) being the polyphase load, and a fan (7) driven by the polyphase motor.

A polyphase current output system according to the present invention includes the polyphase inverter or the air sending device, a current detecting circuit (5) for detecting the output current, and a control circuit (1) for controlling an operation of the low side control circuit (44) based on the output current.

A first aspect of a control method of a polyphase inverter according to the present invention is a method for controlling a polyphase inverter (4) including a switching circuit (45), a plurality of capacitors (33), a plurality of high side control circuits (41, 42, 43), and a low side control circuit (44).

The switching circuit has a plurality of serial connections of high arm switching devices (Qu, Qv, Qw) and low arm switching devices (Qx, Qy, Qz) provided for each phase, and a plurality of diodes (Du, Dv, Dw, Dx, Dy, Dz) parallelly connected to each of the high arm switching devices and the low arm switching devices for applying a current only in a direction opposite to a direction in which the high arm switching devices and the low arm switching devices apply the current. Ends of a plurality of the high arm switching devices opposite to the low arm switching devices are commonly connected, ends of a plurality of the low arm switching devices opposite to the high arm switching devices are commonly connected, and an output current is output from a connection point of the high arm switching device and the low arm switching device to a polyphase load for each phase.

The capacitors are provided for each phase, one end of each is connected to the connection point for each phase, and is charged by conduction of the low arm switching device.

The high side control circuits are provided for each phase and controls opening and closing of the high arm switching device by receiving an operation power from the corresponding capacitor. The low side control circuit controls opening and closing of the low arm switching device.

A first aspect of the control method is such that the low arm switching device provided at a phase corresponding to the output current that gives the largest value compared between phases, is allowed to conduct (S103, S104, S105), when the output current of any phase is smaller than a predetermined value, a direction from the connection point toward the polyphase load is set to positive (S102), in a period in which all of the high arm switching devices are non-conductive.

A second aspect of the control method of the polyphase inverter according to the present invention is the first aspect of the control method of the polyphase inverter, wherein the low arm switching devices are allowed to conduct in a predetermined order (S106), when the output current of all phases are not smaller than the predetermined value in the period in which all of the high arm switching devices are non-conductive.

A third aspect of the control method of the polyphase inverter according to the present invention is the first or second aspect of the control method of the polyphase inverter, wherein any one of the low arm switching devices (Qx, Qy, Qz) is exceptionally turned on only at first (S100) in the period in which all of the high arm switching devices are non-conductive.

Effect of the Invention

According to the polyphase inverter, the first aspect of the control method thereof and the polyphase current output system of the present invention, the capacitor acts as a bootstrap capacitor of the high side control circuit. Also, in a so-called precharge period in which all of the high arm switching devices are non-conductive, it becomes difficult to apply an overcurrent through the low arm switching device.

According to the air sending device of the present invention, even when the fan receives a wind and rotates not by driving of the polyphase inverter, it is difficult that a voltage generated by the rotation applies the overcurrent through the low arm switching device.

Also, according to the second aspect of the control method, when there is not a possibility that the overcurrent is generated, a normal precharge may be performed.

Also, according to the third aspect of the control method, it is possible to easily decide the low arm switching device to be conducted first.

The object, feature, aspect and advantage of the present invention will become more apparent by the following detailed description and the appended drawings.

PREFERRED EMBODIMENT FOR CARRYING OUT THE INVENTION

First Embodiment

Figure 1:
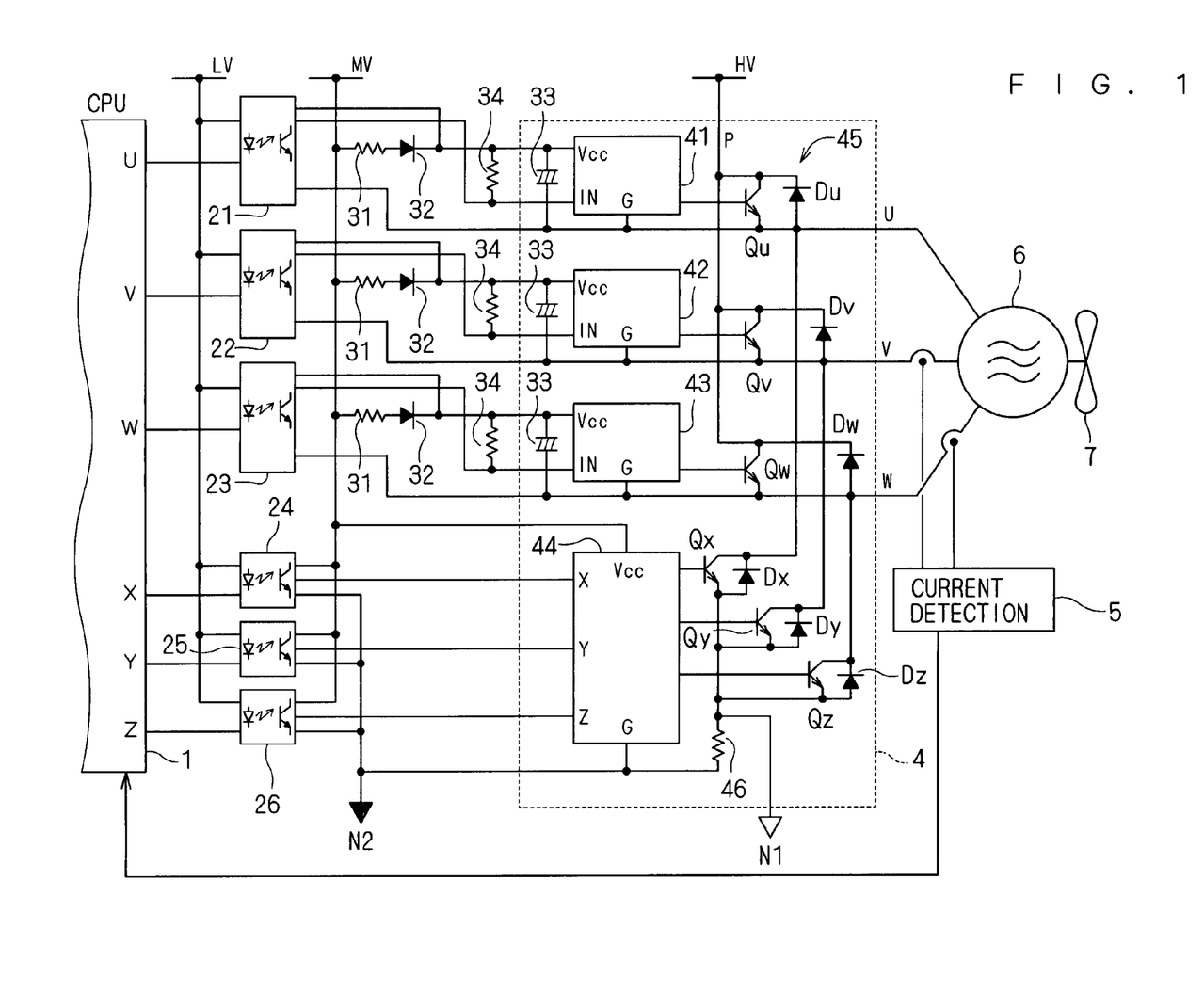
FIG. 1 is a circuit diagram showing a configuration of a polyphase current output system to which a polyphase inverter according to the present invention is applicable.

FIG. 1 is a circuit diagram showing a configuration of a polyphase current output system to which a polyphase inverter according to the present invention is applicable. The system is provided with a polyphase inverter 4 and a motor 6, which is a load thereof, and is further provided with a circuit for controlling an operation of the polyphase inverter 4. The motor 6 drives, for example, a fan 7.

The polyphase inverter 4 is provided with a switching circuit 45. The switching circuit 45 has a plurality of serial connections of high arm switching devices Qu, Qv and Qw of U-phase, V-phase and W-phase, respectively, and low arm switching devices Qx, Qy and Qz of U-phase, V-phase and W-phase, respectively. An IGBT (insulated gate bipolar transistor), for example, may be adopted as the switching devices, in addition to a general power transistor.

Diodes Du, Dv, Dw, Dx, Dy and Dz are parallelly connected to each of the high arm switching devices Qu, Qv and Qw and the low arm switching devices Qx, Qy and Qz, respectively. A direction of a current, which these diodes apply, and a direction of the current, which the above-described switching devices apply, are opposite to each other.

Ends of the high arm switching devices Qu, Qv and Qw on a side opposite to the low arm switching devices Qx, Qy and Qz, collectors, for example, are commonly connected. An electrical potential HV of about 300 V, for example, is applied to this connection point in order to be applied to the motor 6.

Ends of the low arm switching devices Qx, Qy and Qz on a side opposite to the high arm switching devices Qu, Qv and Qw, emitters, for example, are commonly connected. A node point N1 is connected to this connection point. A node point N2 is connected to the node point N1 through a resistance 46. The node point N2 is a ground point, for example.

Also, from the connection point of the switching devices Qu and Qx, for example, from the connection point of the emitter of the high arm switching device Qu and the collector of the low arm switching device Qx, an output current of U-phase is output. In the same way, from the connection points of the switching devices Qv and Qy and of the switching devices Qw and Qz, output currents of V-phase and W-phase are output, respectively. These output currents are supplied to the motor 6.

The polyphase inverter 4 is further provided with capacitors 33, which are provided for each phase, and one ends thereof are connected to the connection points (that is to say, points at which the output current is output) of the high arm switching device and the low arm switching device for each phase. An electrical potential MV of 16 V, for example, which is the potential higher than that of the node point N1, is supplied to the other ends of the capacitors 33 through a resistor 31 and a diode 32.

The resistor 31 is provided in order to limit a charging current of the capacitor 33, and the diode 32 directs a forward direction thereof from a side of the above-described high electrical potential to a side of the capacitor 33 so as to prevent discharge of the capacitor 33 through the resistor 31.

By connecting the capacitors 33 in this way, the low arm switching devices Qx, Qy and Qz are turned on, and each of the capacitors 33 corresponding to the U-phase, V-phase and W-phase are charged, respectively.

The polyphase inverter 4 is also provided with high side control circuits 41, 42 and 43, which are provided for each phase, to control opening and closing of the high arm switching devices Qu, Qv and Qw, respectively. Each of the high side control circuits 41, 42 and 43 receives an operation current from the capacitor 33 of corresponding phase.

In addition, the polyphase inverter 4 is also provided with a low side control circuit 44, which is provided for each phase, to control opening and closing of the low arm switching devices Qx, Qy and Qz.

Components of the polyphase inverter 4 may be contained in one case, or the components other than the capacitors 33 may be contained in one case.

Each of the high side control circuits 41, 42 and 43 has a power input ends Vcc and G, and the capacitor 33 is connected therebetween. The above-described one end and the other end of the capacitor 33 are connected to the power input ends G and Vcc, respectively.

The low side control circuit 44 also has the power input ends Vcc and G, and the electrical potential MV is applied to the power input end Vcc, and the node point N2 is connected to the power input end G.

Each of the high side control circuits 41, 42 and 43 further has an input end IN, which receives a control signal, and receive opening and closing command, which is specified by a CPU 1, as a predetermined electrical potential level. Switching circuits 21 to 26 and a resistor 34 are provided in order to level-shift a signal from the CPU 1 to the predetermined electrical potential level. The switching circuits 21 to 26 may insulate a side of the CPU 1 and a side of the high side control circuits 41, 42 and 43 and the low side control circuit 44 by using a photocoupler, for example. The present invention is applicable even when the photocoupler is not used and the insulation is not obtained.

The switching circuits 21 to 23 are provided for the high side control circuits 41, 42 and 43, and an electrical potential LV (5 V, for example) corresponding to an output level of the CPU 1 is given, and both ends of the capacitor 33 are connected.

The switching circuit 21 receives a command to open and close the high arm switching device of U-phase from the CPU 1, and converts the same together with the resistor 34 to an electrical potential difference in a voltage of the both ends of the capacitor 33. The switching circuits 22 and 23 operate in the same way.

The switching circuits 24 to 26 are provided for the low side control circuit 44, and the electric potential LV corresponding to the output level from the CPU 1 is given, and further, the power input ends Vcc and G of the low side control circuit 44 are connected. Therefore, the switching circuit 24 receives a command to open and close the low arm switching device of U-phase from the CPU 1 and converts the same to the electric potential difference between the electric potential MV and the node point N2. The switching devices 25 and 26 operate in the same way.

Figure 2:
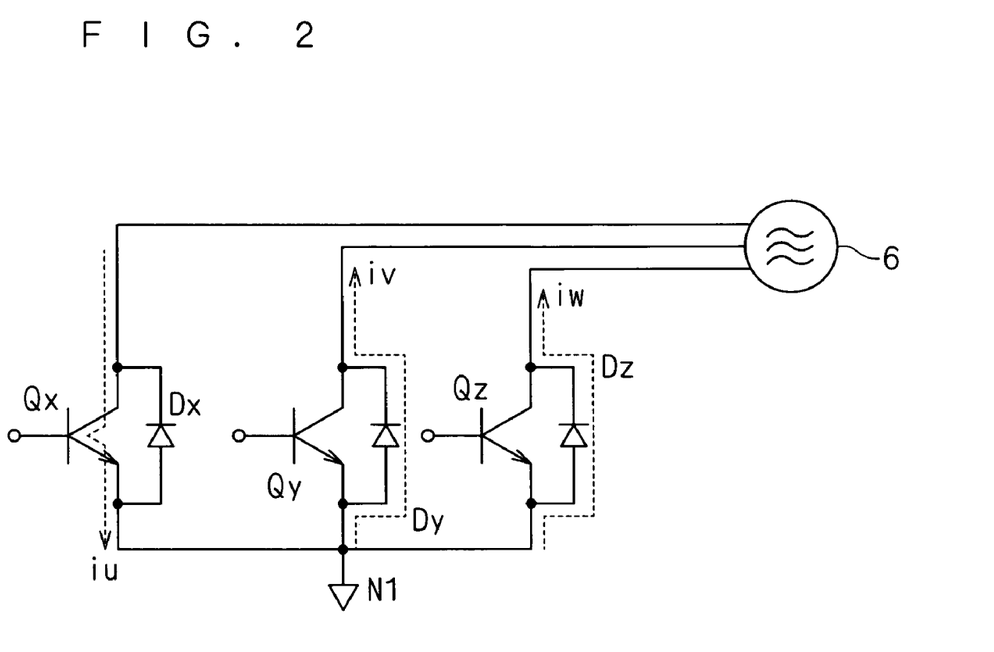
FIG. 2 is a circuit diagram showing currents iu, iv and iw flowing through a low switching device and a diode.

FIG. 2 is a circuit diagram showing currents iu, iv and iw flowing between the switching circuit 45 and the motor 6 by setting a direction from the node point N1 toward the motor 6 to positive in a precharge period. Since all of the high arm switching devices Qu, Qv and Qw become non-conductive in the precharge period, herein, the low arm switching devices Qx, Qy and Qz, the diodes Dx, Dy and Dz parallelly connected to them, respectively, the motor 6 and the node point N1 are shown.

In a state in which the low arm switching devices Qx, Qy and Qz are in states of on, off and off, respectively, when the electrical potential of the U-phase of the motor 6 is higher than that of the V-phase and W-phase, a negative current iu flows through the low arm switching device Qx, and positive currents iv and iw flow through the diodes Dy and Dz. Also, it is required that an absolute value of the current iu (<0) flowing through the low arm switching device Qx is made small, as described in "Problem to be solved by the invention". Then, the low side control circuit 44 operates in a following way.

Figure 3:
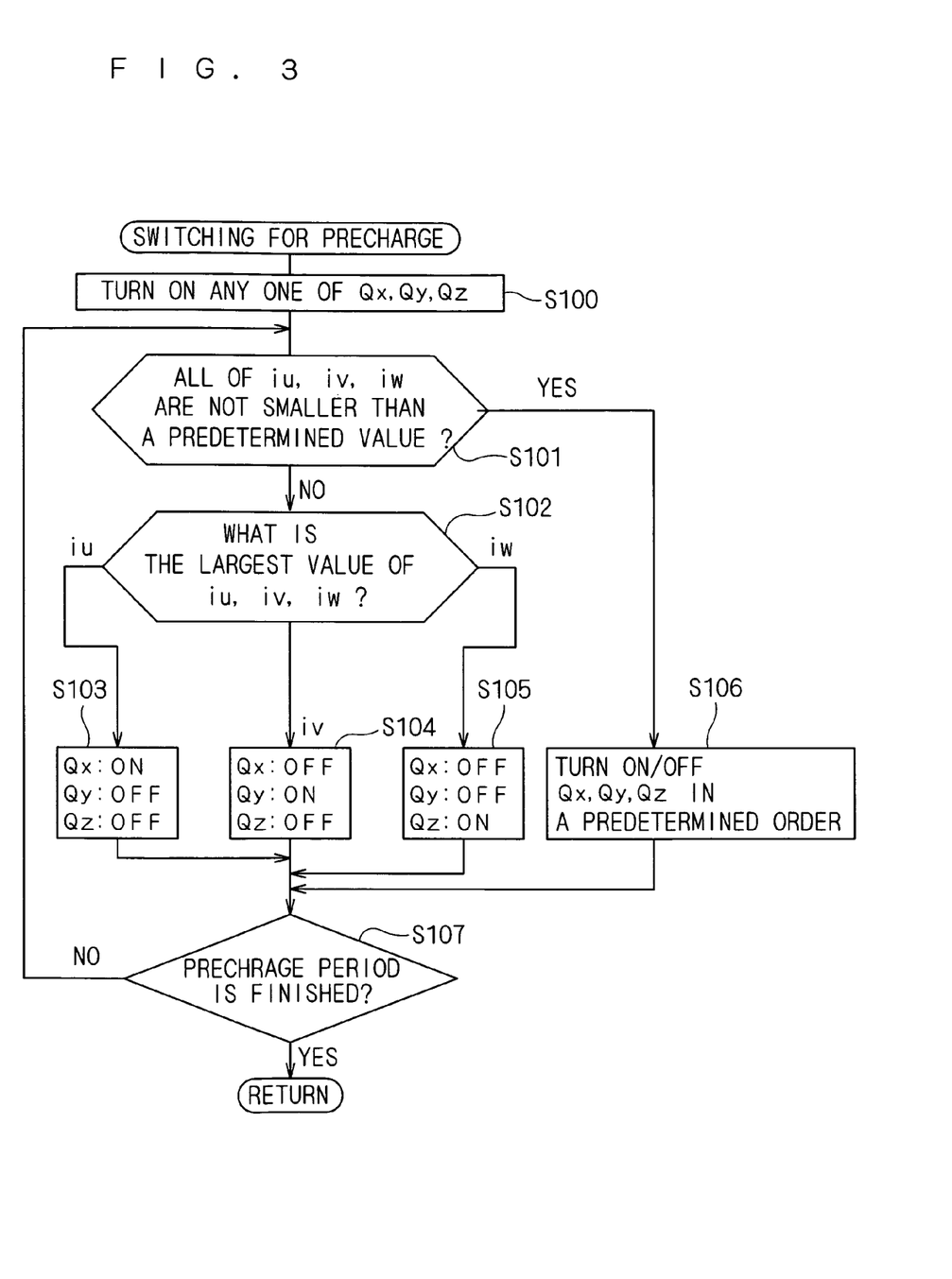
FIG. 3 is a flow chart showing an operation of a switching for precharge of a low side control circuit according to the present invention.

FIG. 3 is a flow chart showing an operation of a switching for precharge of the low side control circuit 44. The flow chart shows an operation other than that in a case of normally driving the load. In a case of normally driving the load, a procedure shifts to a flow chart of a known normal operation through "RETURN" of the flow chart.

First, in step S100, any one of the low arm switching devices Qx, Qy and Qz is turned on. Next, in step S101, it is judged whether all of the currents iu, iv and iw are not smaller than a predetermined value or not. The currents iu, iv and iw, a direction from the connection point of the low arm switching device and the high arm switching device of each phase toward the polyphase load being set to positive, have positive values when the currents iu, iv and iw flow through the diodes Dx, Dy and Dz. On the other hand, when they pass through the low arm switching devices Qx, Qy and Qz, the values are negative.

Therefore, the predetermined value, which is criteria of judgment, is zero or a negative value, and the absolute value thereof is selected to be smaller than the absolute value of the current, which flows without damaging the low arm switching.

Then, since it is required to prevent the absolute value of the current flowing through the low arm switching device from being large, when all of the currents iu, iv and iw are not smaller than zero or a negative predetermined value, the above-described overcurrent is not problematic. In such a case, a judgment result in step S101 is affirmative (YES), and the procedure shifts to step S106.

In step S106, a normal precharge is performed. That is to say, the low arm switching devices Qx, Qy and Qz are turned on/off in a predetermined order. Thereby, when there is not a possibility that the overcurrent is generated, the normal precharge may be executed.

In general, all of the switching devices are turned off before the precharge, so that it is considered that all of the currents iu, iv and iw are zero, at first. Therefore, when the predetermined value is set to the negative value, the procedure shifts from step S101 to step S106. Therefore, step S100 may be omitted.

However, it is preferable that step S100 is provided because the switching device to be turned on first may be easily decided.

On the other hand, when the fan 7, which is driven by the motor 6, is rotated by an external cause such as a wind and the voltage is generated on the motor 6, there is a case that the judgment result in step S101 is negative (NO). In such a case, that is to say, when any one of the currents iu, iv and iw is smaller than the negative predetermined value (if the absolute value is larger), it is judged which is the largest value. When the current iu is the largest value, the procedure shifts to step S103 and the low arm switching devices Qx, Qy and Qz are turned on, off and off, respectively. When the current iv is the largest value, the procedure shifts to step S104 and the low arm switching devices Qx, Qy and Qz are turned off, on and off, respectively. When the current iw is the largest value, the procedure shifts to step S105 and the low arm switching devices Qx, Qy and Qz are turned off, off and on, respectively.

After processes of steps S103 to S106 are executed, the procedure shifts to step S107, and it is judged whether the precharge period is finished or not. If the judgment result is affirmative, the procedure shifts to the flow chart (not shown) in a case of normally driving the load, through the "RETURN".

If the judgment result is negative, the precharge period continues, so that the procedure returns to step S101.

In this manner, by turning off the low arm switching device before the current, which flows through the low arm switching device of one phase, becomes the overcurrent, it becomes difficult that the overcurrent is generated. In that sense, it is possible to turn off the low arm switching device of the phase corresponding to any of the currents iu, iv and iw of which value is smaller than the predetermined value and turn on any other low arm switching device.

For example, in an example shown in FIG. 2, the low arm switching device Qz is turned on when the current iw is larger than the current iv in the above-described flow chart, and the low arm switching device Qy is turned on when the current iv is larger than the current iw. However, when any one of the low arm switching devices Qy and Qz is turned on without comparing a size of the currents iv and iw, it is possible to make it difficult that the overcurrent is generated in the low arm switching device Qx, first of all.

However, if the low arm switching device Qz is turned on when the current iv is larger than the current iw, when the current iv is extremely large, it is highly possible that the overcurrent is easy to flow through the low arm switching device Qz. Therefore, it is preferable that the low arm switching device of the phase corresponding to the current that gives the largest value, is turned on, as in the shift from step S102 to steps S103, S104 and S105 shown in FIG. 3. Thereby, it is possible to prevent rising of a direct current voltage based on regenerative operation status.

The polyphase current output system shown in FIG. 1 is further provided with a current detecting circuit 5 for detecting the currents iu, iv and iw. Then the detected result is given to the CPU 1, and the control of steps S101 to S107 is performed by the CPU 1. Since a sum of the currents iu, iv and iw is zero, it is possible to omit the detection of the current iu of the U-phase as illustrated in FIG. 1, and this may be obtained in the CPU 1 by inverting a sign of the sum of the currents iv and iw.

Example

Figure 4:
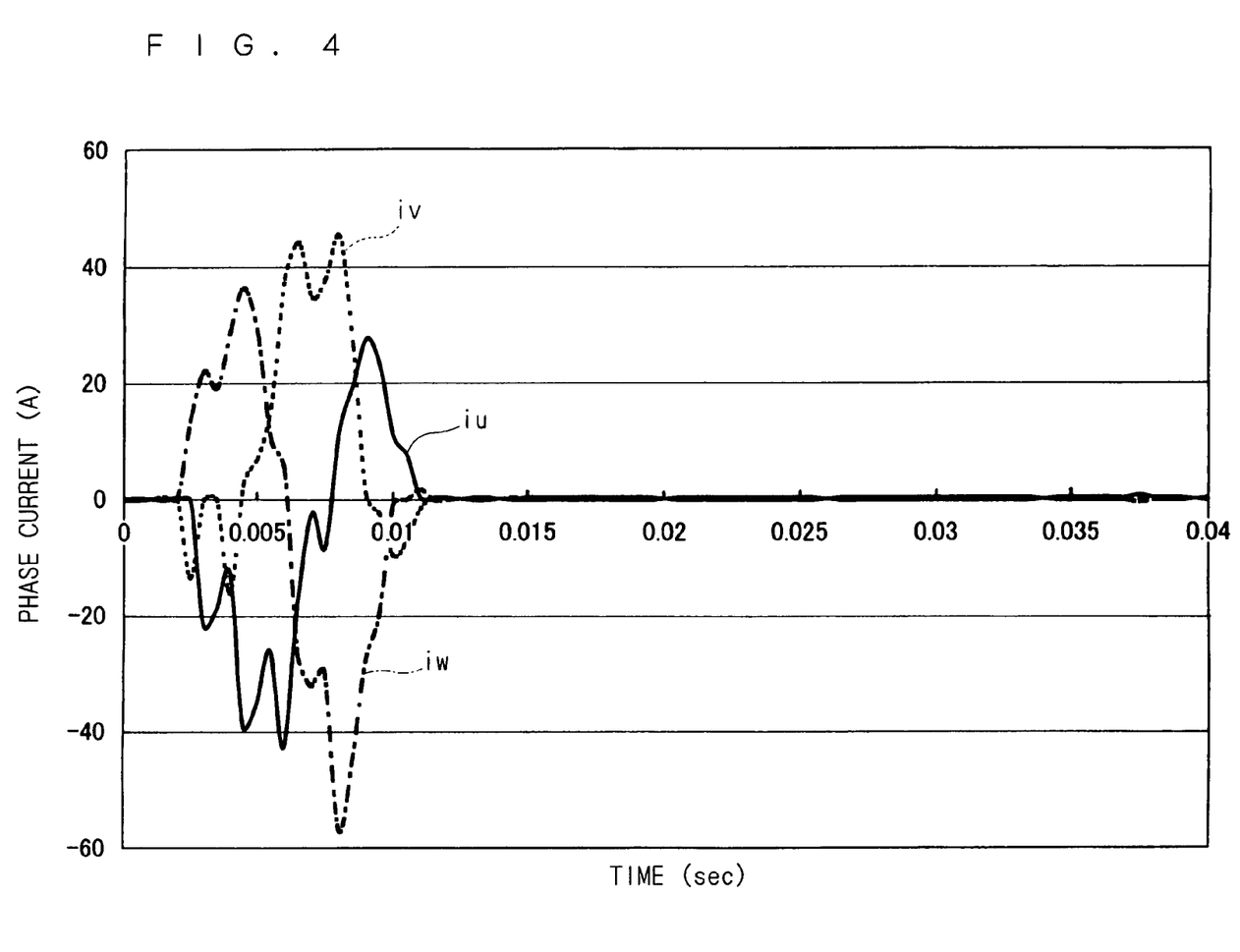
FIG. 4 is a graph showing currents iu, iv and iw in a conventional technique.
Figure 5:
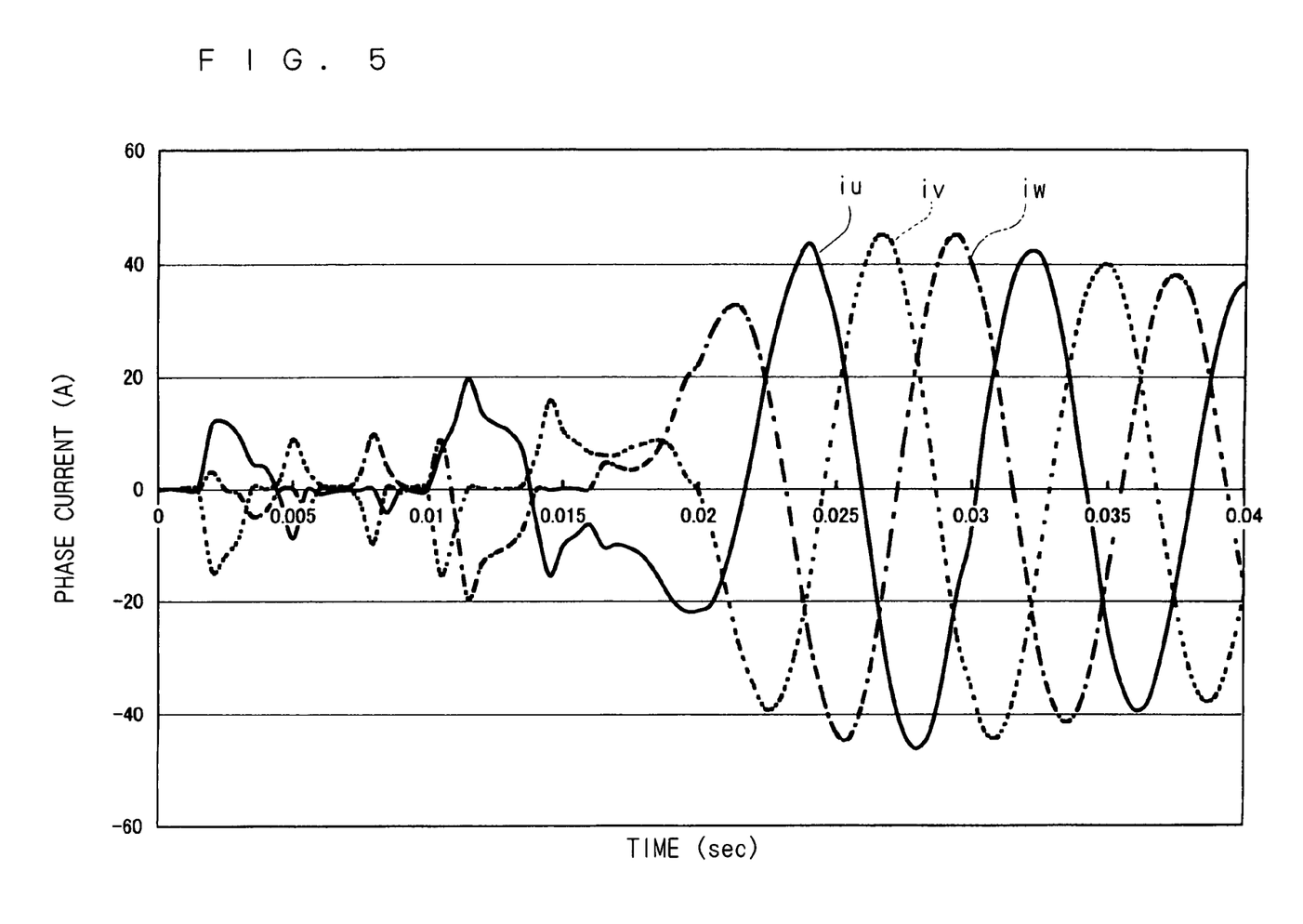
FIG. 5 is a graph showing currents iu, iv and iw in the present invention.

FIGS. 4 and 5 are graphs showing the currents iu, iv and iw, and this shows a case in which the voltage is generated by the external cause at the motor 6 in the precharge period. FIG. 4 shows a case of the conventional precharge, and FIG. 5 shows a case of the precharge adopting the present invention (both are simulations in which 2700 rotations/minute is supposed).

In FIG. 4, the current iw was lower than −55 A at a point of 0.08 second (8 ms), and it was recognized as the overcurrent. Thereby, the precharge is stopped (all of the switching devices were turned off), so that the currents iu, iv and iw are substantially zero.

In FIG. 5, the absolute values of the currents iu, iv and iw are not larger than 50 A, so that the precharge continues without generating the overcurrent.

Even in a case in which the process to protect the polyphase inverter by recognizing the overcurrent in such a manner is adopted and the voltage is generated on the load by the external cause, it is possible to make the generation of the overcurrent difficult by applying the present invention and prevent suspension of the precharge.

Of course, the present invention is applicable to the polyphase load other than the motor 6. However, this is preferable when the polyphase load in which the voltage is generated by the external cause, such as the motor 6 provided with the fan 7, is adopted. For example, it is preferable to apply the present invention to an air sending device provided with the polyphase inverter 4, the motor 6 and the fan 7.

As the air sending device in which the fan 7 is rotated by the external cause, for example, there is an outdoor unit of an air conditioner.

Although the present invention has been described in detail, the above-described description is an illustration in every aspect and the present invention is not limited to this. It is considered that a number of alternative examples, which are not illustrated, may be conceived without deviating from the scope of the present invention.

The invention claimed is:

1. A polyphase inverter, comprising:
a switching circuit having:
a plurality of serial connections of high arm switching devices and low arm switching devices provided for each phase; and
a plurality of diodes parallelly connected to each of said high arm switching devices and said low arm switching devices for applying a current only in a direction opposite to a direction in which said high arm switching devices and said low arm switching devices apply the current, ends of a plurality of said high arm switching devices opposite to said low arm switching devices being commonly connected, ends of a plurality of said low arm switching devices opposite to said high arm switching devices being commonly connected, and outputting an output current from a connection point of said high arm switching device and said low arm switching device toward a polyphase load for each phase;
a plurality of capacitors charged by conduction of said low arm switching devices, provided for each phase, one end of each being connected to said connection point for each phase;
a plurality of high side control circuits provided for each phase for controlling opening and closing of said high arm switching devices by receiving an operation power from corresponding said capacitor; and a low side control circuit for allowing said low arm switching device provided at a phase corresponding to said output current that gives the largest value compared between phases to conduct, when said output current of any phase is smaller than a predetermined value, a direction from said connection point to said polyphase load being set to positive, in a period in which all of said high arm switching devices are non-conductive.

2. An air sending device, comprising:

the polyphase inverter according to claim 1;

a polyphase motor being said polyphase load; and a fan driven by said polyphase motor.

3. A polyphase current output system, comprising:

the polyphase inverter according to claim 1 a current detecting circuit for detecting said output current; and a control circuit for controlling an operation of said low side control circuit based on said output current.

4. A method for controlling a polyphase inverter comprising:

a switching circuit having:

a plurality of serial connections of high arm switching devices and low arm switching devices provided for each phase; and a plurality of diodes parallelly connected to each of said high arm switching devices and said low arm switching devices for applying a current only in a direction opposite to a direction in which said high arm switching devices and said low arm switching devices apply the current, ends of a plurality of said high arm switching devices opposite to said low arm switching devices being commonly connected, ends of a plurality of said low arm switching devices opposite to said high arm switching devices being commonly connected, and outputting an output current from a connection point of said high arm switching device and said low arm switching device toward a polyphase load for each phase;

a plurality of capacitors charged by conduction of said low arm switching device, provided for each phase, one end of each being connected to said connection point for each phase;

a plurality of high side control circuits provided for each phase for controlling opening and closing of said high arm switching devices by receiving an operation power from corresponding said capacitor; and a low side control circuit for controlling opening and closing of said low arm switching device, said method allowing said low arm switching device provided at a phase corresponding to said output current that gives the largest value compared between phases to conduct, when said output current of any phase is smaller than a predetermined value, a direction from said connection point toward said polyphase load being set to positive, in a period in which all of said high arm switching devices are non-conductive.

5. The method for controlling the polyphase inverter according to claim 4, wherein said low arm switching device is allowed to conduct in a predetermined order when said output current of all phases is not smaller than said predetermined value, in said period in which all of said high arm switching devices are non-conductive.

6. The method for controlling the polyphase inverter according to claim 4, wherein any one of said low arm switching devices is exceptionally turned on only at first, in said period in which all of said high arm switching devices are non-conductive.

7. A polyphase current output system, comprising:

the air sending device according to claim 2;

a current detecting circuit for detecting said output current; and a control circuit for controlling an operation of said low side control circuit based on said output current.

8. The method for controlling the polyphase inverter according to claim 5, wherein any one of said low arm switching devices is exceptionally turned on only at first, in said period in which all of said high arm switching devices are non-conductive.

* * * * *